(12) United States Patent
Yamada

(10) Patent No.: US 8,244,023 B2
(45) Date of Patent: Aug. 14, 2012

(54) SHAPE MEASURING DEVICE AND SHAPE MEASURING METHOD

(75) Inventor: Tomoaki Yamada, Yokohama (JP)

(73) Assignee: Nikon Corporation, Tokyo (JP)

( * ) Notice: Subject to any disclaimer, the term of this patent is extended or adjusted under 35 U.S.C. 154(b) by 511 days.

(21) Appl. No.: 12/565,179

(22) Filed: Sep. 23, 2009

(65) Prior Publication Data

US 2010/0008543 A1   Jan. 14, 2010

Related U.S. Application Data

(63) Continuation of application No. PCT/JP2008/054975, filed on Mar. 18, 2008.

(30) Foreign Application Priority Data

Apr. 5, 2007 (JP) .................................. 2007-099929

(51) Int. Cl.
    *G06K 9/00* (2006.01)
(52) U.S. Cl. .......................... 382/141; 382/181; 359/559
(58) Field of Classification Search .................. 382/141, 382/181; 358/559
    See application file for complete search history.

(56) References Cited

U.S. PATENT DOCUMENTS

| 4,731,853 A * | 3/1988 | Hata et al. ...................... 382/153 |
| 5,509,090 A * | 4/1996 | Maruyama et al. ........... 382/276 |
| 6,678,411 B1 * | 1/2004 | Crill .............................. 382/181 |
| 6,747,745 B2 * | 6/2004 | Ishikawa et al. .............. 356/614 |
| 6,839,144 B2 * | 1/2005 | Okada et al. .................. 356/606 |
| 2003/0067613 A1 * | 4/2003 | Ishikawa et al. .............. 356/614 |
| 2005/0058333 A1 * | 3/2005 | Kaneko et al. ................. 382/141 |

FOREIGN PATENT DOCUMENTS

| JP | 09-126735 A | 5/1997 |
| JP | 09-1996633 A | 7/1997 |
| JP | 2000-009444 A | 1/2000 |
| JP | 2003-166813 A | 6/2003 |
| JP | 2004-053427 A | 2/2004 |

* cited by examiner

*Primary Examiner* — Hadi Akhavannik
(74) *Attorney, Agent, or Firm* — Morgan, Lewis & Bockius LLP

(57) ABSTRACT

A shape measuring device includes: a slit pattern projection unit (1) for projecting a slit light onto a test object (20); an imaging lens (3) and a plane parallel plate (4) for forming a plurality of slit images, which is generated when the slit light is reflected by the object (20), separated in a direction perpendicular to a slit base line direction; an imaging unit (5) for picking up the plurality of slit images and generating a plurality of slit picture images; an XYZ stage drive unit (12) for relatively moving the slit light and the test object (20) in a direction different from the slit base line direction of the slit light; a slit picture image selection unit (8) for comparing the brightness of each pixel of slit picture image on the slit base line direction, and selecting a slit picture image having an optimum brightness to determine the shape of the test object (20) on the slit base line direction, and acquiring image data to determine the shape of the test object (20); and a shape computing unit (9) for computing a shape of the test object (20) using a relative position of the slit light with respect to the test object (20) and the slit picture image data.

11 Claims, 10 Drawing Sheets

SHAPE MEASURING DEVICE AND SHAPE MEASURING METHOD

This is a continuation of PCT International Application No. PCT/JP2008/054975, filed on Mar. 18, 2008, which is hereby incorporated by reference. This application also claims the benefit of Japanese Patent Application No. 2007-099929, filed in Japan on Apr. 5, 2007, which is hereby incorporated by reference.

TECHNICAL FIELD

The present invention relates to a measuring device and measuring method for measuring a three-dimensional shape (i.e. geometry) of a test object, using a light-section method.

TECHNICAL BACKGROUND

Various technologies to measure the surface shape of an object, such as industrial products, have been proposed, and an optical three-dimensional shape measuring device is one of these. There are various types and configurations of optical three-dimensional shape measuring devices, and one of these implements that projecting a predetermined projection pattern (e.g. slit light, stripes) onto a test object, taking an image of the test object, and measuring the height of a reference plane of each image position (each pixel) based on the captured image, for measuring the three-dimensional surface shape of the test object (see Patent Document 1).

Such a device is constructed such that a slit projection pattern formed of one slit light is projected onto the surface of the test object, and an image of the slit projection pattern projected onto the test object from an angle different from the projection direction is picked up every time the slit projection pattern is scanned on the entire surface area of the test object, the height of the surface of the test object from a reference plane is calculated using such a principle as trigonometric measurement for each pixel in a longitudinal direction of the slit projection pattern based on the picked up image of the surface of the test object, and the three-dimensional shape of the surface of the test object is determined.

FIG. 9 shows a configuration example thereof, where the slit light 52 is projected from the slit pattern projection unit 51 and a slit projection pattern is projected onto the surface of a test object 53 placed on a supporting stand 56. The slit projection pattern projected onto the surface of the test object 53 is transformed according to the three-dimensional shape on the surface of the test object 53, and every time the slit projection pattern is scanned onto the entire surface of the test object 53 by moving the supporting stand 56 in a direction different from the longitudinal direction of the slit projection pattern (e.g. arrow direction in FIG. 9) by a supporting stand moving device (not illustrated), the transformed slit projection pattern of the surface of the test object 53 is picked up by the imaging device 55 (e.g. CCD sensor) via an imaging lens 54 in an angle different from the projection direction, and is sent to a processing unit 57 where the captured image data is computed. In the processing unit 57, the height of the surface of the test object from the reference plane is calculated for each pixel of the slit projection pattern in the longitudinal direction using the principle of trigonometric measurement based on the captured image data on the surface of the test object picked up in this way, thereby determining a three-dimensional shape of the test object surface.

Patent Document 1: Japanese Patent Application Laid-Open No. 2000-9444

DISCLOSURE OF THE INVENTION

Problems to be Solved by the Invention

In the three-dimensional measurement using the above mentioned slit light projection method, one slit picture image is picked up for the slit projection pattern formed of one slit light projected on the surface of the test object, and only the pixels where the slit picture image is formed on the image formation plane have information, and many surplus pixels are generated. Another problem is that the slit projection pattern is projected on the surface of the test object with a predetermined brightness distribution, so a slit picture image having sufficient brightness distribution, to measure the shape of the test object, may not be acquired depending on the characteristics of the surface of the test object (e.g. inclination and material of the surface), which is a problem, and also increasing the angle formed by the projection system and imaging system improves the measurement accuracy, but increase occlusion, and increases the area where measurement cannot be performed.

With the foregoing in view, it is an object of the present invention to provide a measuring device and measuring method for acquiring a slit picture image without receiving the influence of the characteristics of the surface of the test object, effectively using surplus pixels on the image formation plane, or acquiring a slit picture image with less occlusion, so that a three-dimensional shape can be accurately measured.

Means to Solve the Problems

To solve the above problem and achieve the object, a shape measuring device according to the present invention comprises: a projection unit that projects a slit projection pattern formed of one slit light onto a test object; a slit image formation unit that forms a plurality of slit images, which is generated when the slit projection pattern projected from the projection unit is reflected by the test object, separated in a direction perpendicular to a slit base line direction; an imaging unit that picks up the plurality of slit images separately formed by the slit image formation unit to generate a plurality of slit picture images; a position adjustment unit that relatively moves the slit projection pattern and the test object in a direction different from the slit base direction of the slit projection pattern; a slit picture image selection unit that compares the brightness of each pixel of slit picture images on the slit base line direction and selects, out of the plurality of slit picture images acquired by the imaging unit, slit picture images in each pixel having an optimum brightness to determine the shape of the test object on the slit base line direction, and acquires slit picture image data for determining the shape of the test object; and a shape computing unit that computes a shape of the test object using a relative position of the slit projection pattern with respect to the test object which has been relatively moved by the position adjustment unit, and the slit picture image data acquired by the slit picture image selection unit.

In the imaging unit, it is preferable that the plurality of slit picture images are formed in the direction perpendicular to the slit base line direction separately as a first slit picture image and at least a second slit picture image, in which brightness distribution of the first slit image is changed.

In the imaging unit, it is preferable that the plurality of slit picture images are formed in the direction perpendicular to the slit base line direction separately as a first slit picture image and a second slit picture image, which is picked up in a position closer to the projection light axis than the first slit picture image.

In the imaging unit, it is preferable that the plurality of slit picture images are formed, in the direction perpendicular to the slit base line direction separately as a first slit picture image and a second slit picture image which is picked up in a position closer to the projection light axis than the first slit picture image and is formed with a smaller numerical aperture than the first slit picture image.

In the imaging unit, it is preferable that at least the first slit picture image is formed at a focal position on the image formation plane by inclining the image formation plane with respect to an optical axis of the reflected light generated when the slit projection pattern projected from the projection unit is reflected by the test object, so that the focal plane at the test object side matches the optical axis of the slit projection pattern.

It is preferable that a shape calibration coefficient for each of the plurality of slit picture images is acquired using a plurality of calibration slit picture images, which the imaging unit acquires by the projection unit projecting the slit projection pattern onto the calibration plate in the same manner as the test object.

A shape measuring method according to the present invention is a shape measuring method using a shape measuring device, which has: a projection unit that projects a slit projection pattern formed of one slit light onto the test object; a slit image formation unit that forms a plurality of slit picture images, which is generated when the slit projection pattern projected from the projection unit is reflected by the test object, separated in a direction perpendicular to a slit base line direction; an imaging unit for picking up the plurality of slit images separately formed by the slit image formation unit to generate a plurality of slit picture images; and a position adjustment unit for relatively moving the slit projection pattern and the test object in a direction different from the slit base direction of the slit projection pattern, the method comprising: a step in which the projection unit projects the slit projection pattern onto the test object; a step in which the imaging unit picks up the plurality of slit images separately formed by the slit image formation unit and generates a plurality of slit picture images; a step in which the brightness of each pixel of slit picture images is compared on the slit base line direction and a slit picture image having an optimum brightness to determine the height of the test object from the reference plane is selected, out of the plurality of slit picture images, and the slit picture image data to determine the height of the test object from the reference plane is acquired; and a step in which the shape of the test object is measured by using a relative position of the slit projection pattern with respect to the test object which has been relatively moved by the position adjustment unit, and the slit picture image data, and the three-dimensional shape of the test object is determined.

In the step in which the imaging unit generates the plurality of slit picture images, it is preferable that a first slit picture image and at least a second slit picture image, in which the brightness distribution of the first slit picture image is changed, are separately formed in the direction perpendicular to the slit base line direction.

In the step in which the imaging unit generates the plurality of slit picture images, it is preferable that a first slit image and a second slit image, which is picked up in a position closer to a projection light axis than the first slit picture image and is formed with a smaller numerical aperture than the first slit picture image, are separately formed in the direction perpendicular to the slit base line direction.

In the step in which the imaging unit generates the plurality of slit picture images, it is preferable that at least the first slit picture image is formed at a focal position on the image formation plane by inclining the image formation plane with respect to an optical axis of the reflected light generated when the slit projection pattern projected from the projection unit is reflected by the test object, so that the focal plane at the test object side matches the optical axis of the slit projection pattern.

It is preferable that the step in which the shape of the test object is measured further comprises: a step in which the projection unit projects the slit projection pattern onto a calibration plate in the same manner as the test object; a step in which the imaging unit picks up a plurality of calibration slit images separately formed by the slit image formation unit, and generates a plurality of calibration slit picture images; a step in which a height of the calibration plate from the reference plane is determined based on the plurality of calibration slit picture images; a step in which a shape calibration coefficient is acquired for each of the plurality of slit picture images acquired by the imaging unit; and a step in which a height of the test object from the reference plane, determined based on the plurality of slit picture images, is calibrated and an accurate shape measurement result of the test object is acquired.

Advantageous Effects of the Invention

According to the present invention configured as described above, for a test object onto which a slit projection pattern formed of one slit light is projected, a plurality of slit picture images are formed separately in a direction perpendicular to the slit base line direction, and the slit picture images can be acquired without receiving the influence of the characteristics of the surface of the test object, effectively utilizing the surplus pixels on the image forming plane, or slit picture images can be acquired with less occlusion, so that a three-dimensional shape can be accurately determined based on the principle of trigonometric measurement, therefore the three-dimensional shape measurement device with high measurement accuracy can be provided.

BRIEF DESCRIPTION OF THE DRAWINGS

FIG. 1 is a diagram depicting a general configuration of a shape measuring device according to a first embodiment of the present invention, in which FIG. 1A shows the entire device, and FIG. 1B shows the internal configuration of the slit pattern projection unit;

DESCRIPTION OF THE PREFERRED EMBODIMENTS

Embodiments of the shape measuring device and shape measuring method according to the present invention will now be described.

Figure 1:
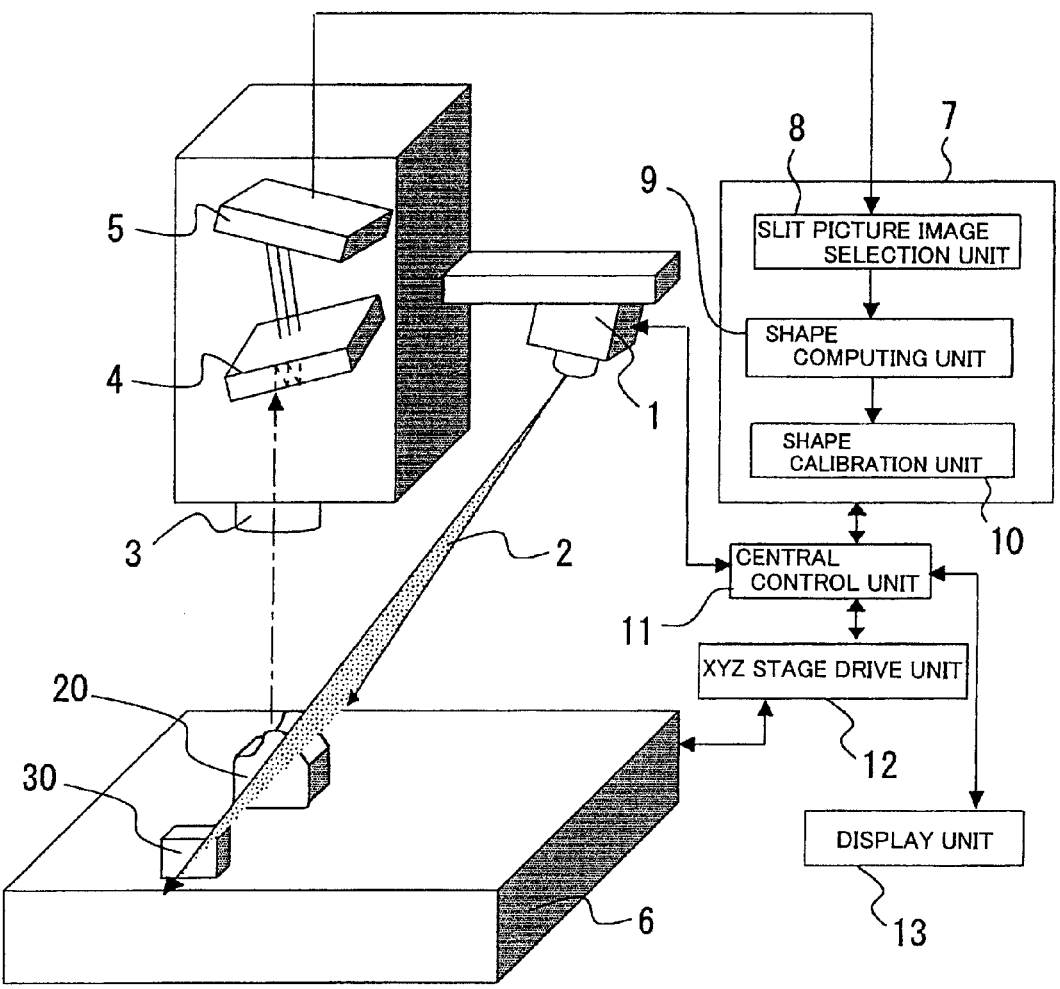
Figure 1:
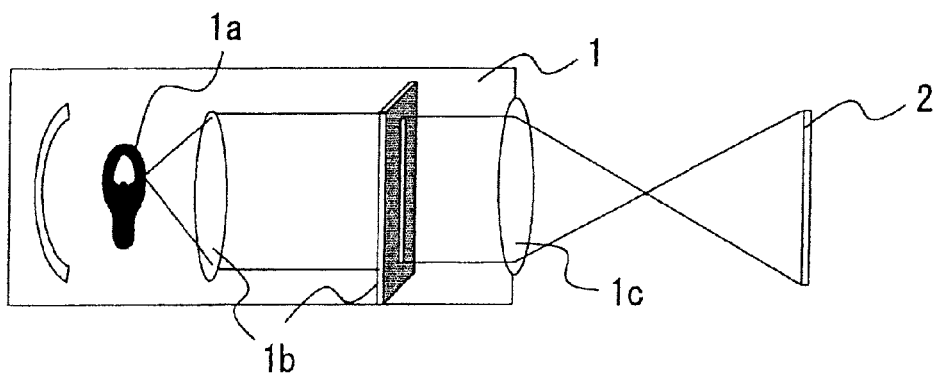

FIG. 1 shows a general configuration of a shape measuring device according to a first embodiment of the present invention, and this shape measuring device is first described with reference to FIG. 1.

As FIG. 1A shows, this shape measuring device comprises: a central control unit 11 which is a computer, a slit pattern projection unit 1 that projects slit light 2 onto a test object 20 and calibration plate 30, an XYZ stage (supporting stand) 6 on which the test object 20 and calibration plate 30 are placed; an imaging unit that picks up a reflected pattern image of the slit light 2 from the slit pattern projection unit 1; an XYZ stage drive unit 12 that drives the XYZ stage 6 (and/or the imaging unit) and relatively moves it in the XYZ directions with respect to the imaging unit; a processing device 7 that processes image data from the imaging unit and computes the shape of the test object 20; and a display unit 13 that displays the shape or shape data (values) of the test object 20 determined by the processing device 7, and is controlled by the central control unit 11. The XYZ stage 6 is constructed such that the test object 20 can be moved in the XYZ directions. The calibration plate 30, of which height H from the stage surface of the XYZ stage 6 is known, is used for calibrating the shape measurement result.

As FIG. 1B shows, the slit pattern projection unit 1 encloses a light source 1a (e.g. projector), pattern formation means 1b which is disposed on the optical axis of the light source 1a for forming a slit light 2 by the light of the light source 1a; and a projection lens 1c for condensing the slit light 2 onto the test object 20. The slit light 2, projected by the slit pattern projection unit 1, projects the slit projection pattern onto the surface of the test object 20 and the calibration plate 30.

The imaging unit is comprised of an imaging lens (group) 3 which is a telecentric optical system, a plane parallel plate (plane parallel glass) 4 for generating a reflected pattern image by separating the reflected pattern image formed by the imaging lens (group) 3 into a plurality of images, and an imaging device 5 (e.g. two-dimensional CCD element) for picking up the reflected pattern images which were separated and formed by the imaging lens (group) 3 and plane parallel plate 4. The image data picked up by the imaging device 5 is sent to the processing device 7, where the later mentioned image processing and shape measurement of the test object 20 are performed. The imaging lens 3 has an optical system in which the principal rays reflected from the test object 20 and the calibration plate 30 are in parallel with the optical axis (object side telecentric optical system).

This shape measuring device is constructed such that an intersection of the imaging surface of the imaging device 5, that picks up the slit projection pattern on the surface of the test object 20 and the calibration plate 30, on which the slit light 2 is projected by the slit pattern projection unit 1, and the principal plane of the imaging lens 3 (plane which passes through the center of the imaging lens 3 and is perpendicular to the optical axis), is located on the optical axis of the slit light 2 (shiempflug's optical system). Therefore images of the test object 20, on which the slit light 2 is projected by the slit pattern projection unit 1 and the slit projection pattern on the surface of the calibration plate 30, can always be picked up at a focal position in the imaging device 5.

The slit pattern projection unit 1 and the imaging unit are integrated and secured by one frame, and the test object 20 and the calibration plate 30 are placed on and supported by the XYZ stage 6 and the XYZ stage drive unit 12, which relatively moves the XYZ stage 6 in a direction different from the optical axis direction, with respect to the frame in which the slit pattern projection unit 1 and imaging unit are integrated. Because of this, every time the XYZ stage 6 is moved by the XYZ stage drive unit 12, a slit projection pattern (by the slit light 2) is projected onto the test object 20 and the calibration plate 30 by the slit pattern projection unit 1, and as a result, the slit projection pattern can be projected onto the entire surface of the test object 20 and the calibration plate 30. The XYZ stage drive unit 12 has an encoder for acquiring the positions of the XYZ stage 6 and the test object 20 placed on the XYZ stage 6 in a stage moving direction, that is, the scanning direction of the slit projection pattern.

The processing device 7 has: a slit picture image selection unit 8 that selects each pixel of slit picture images having an optimum brightness to compute the height of the surface of the test object 20 from the reference plane (stage surface of the XYZ stage 6) out of the images picked up by the imaging device 5, a shape computing unit 9 that measures the shape of the test object 20 using the slit picture image data acquired by the slit picture image selection unit 8 and a signal from the encoder installed in the XYZ stage drive unit 12 (signal to indicate a position of the slit projection pattern in the scanning direction on the surface of the test object 20); and a shape calibration unit 10 that computes a height of the surface of the calibration plate 30 from the stage surface based on the image picked up by the imaging device 5 by projecting the same slit projection pattern used for the test object 20 onto the calibration plate 30 to obtain a shape calibration coefficient, and acquire an accurate shape measurement result of the test object 20.

Figure 2:
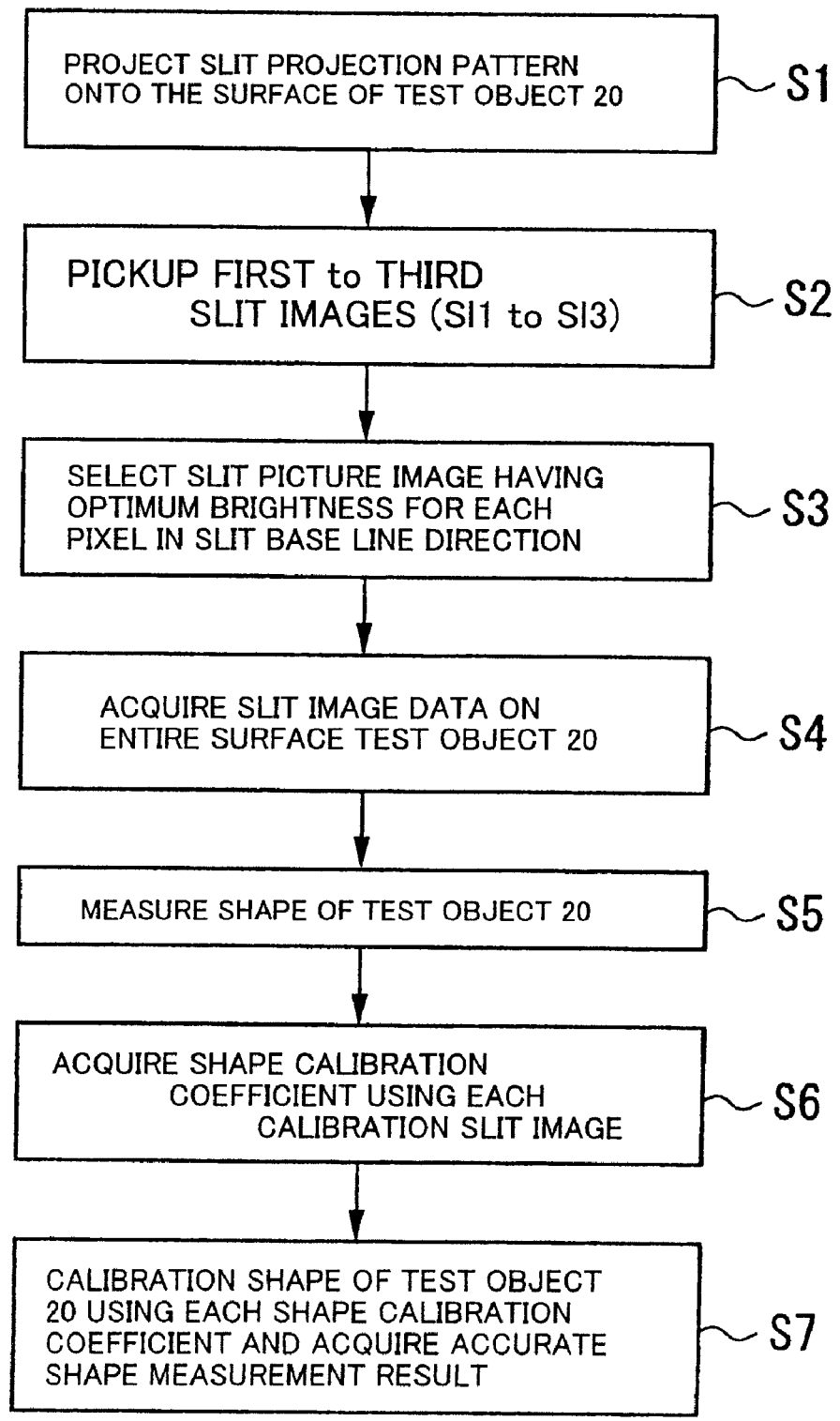
FIG. 2 is a flow chart depicting a shape measuring method according to the first embodiment.

A method for measuring the shape of the test object 20 using the shape measuring device constructed as above will now be described with reference to the flow chart in FIG. 2.

For this measurement, the slit light 2 projected from the slit pattern projection unit 1 is irradiated onto the test object 20, so as to project the slit projection pattern on the surface of the test object 20 (step S1). The lights projected like this and reflected from the surface of the test object 20 (including scattered lights) are condensed via the imaging lens 3 and the plane parallel plate 4, and the imaging device 5 picks up the slit projection pattern projected on the surface of the test object 20 (step S2).

The plane parallel plate 4 has a half mirror with 50% reflectance for both the top face and bottom face, and is disposed between the imaging lens 3 in the imaging unit and the imaging device 5, with an inclination angle with respect to the optical axis. Therefore the slit projection pattern is projected onto the surface of the test object 20, and the lights reflected by the surface of the test object 20 and condensed by the imaging lens 3 pass through the plane parallel plate 4, and are split at this time into a first reflected light which directly passes through the plane parallel plate 4, a second reflected light which was reflected once on the top face and bottom face respectively and of which brightness decreased to ¼ of the first reflected light, and a third reflected light which was reflected twice on the top face and bottom face respectively and of which brightness decreased to ¹⁄₁₆ of the first reflected light, in a direction perpendicular to a slit base line direction, which is longitudinal direction of the slit projection pattern with an equal interval (see FIG. 1 and FIG. 3). Actually the fourth and fifth reflected lights also exist, but are not suitable for measuring the shape of the test object 20 since the brightness thereof is decreased to 1/64 (fourth reflected light) or less compared with the first reflected light, so only up to the third reflected light is shown here. The slit base line direction is a longitudinal direction of the slit projection pattern when the slit projection pattern is projected on the plane.

Figure 3:
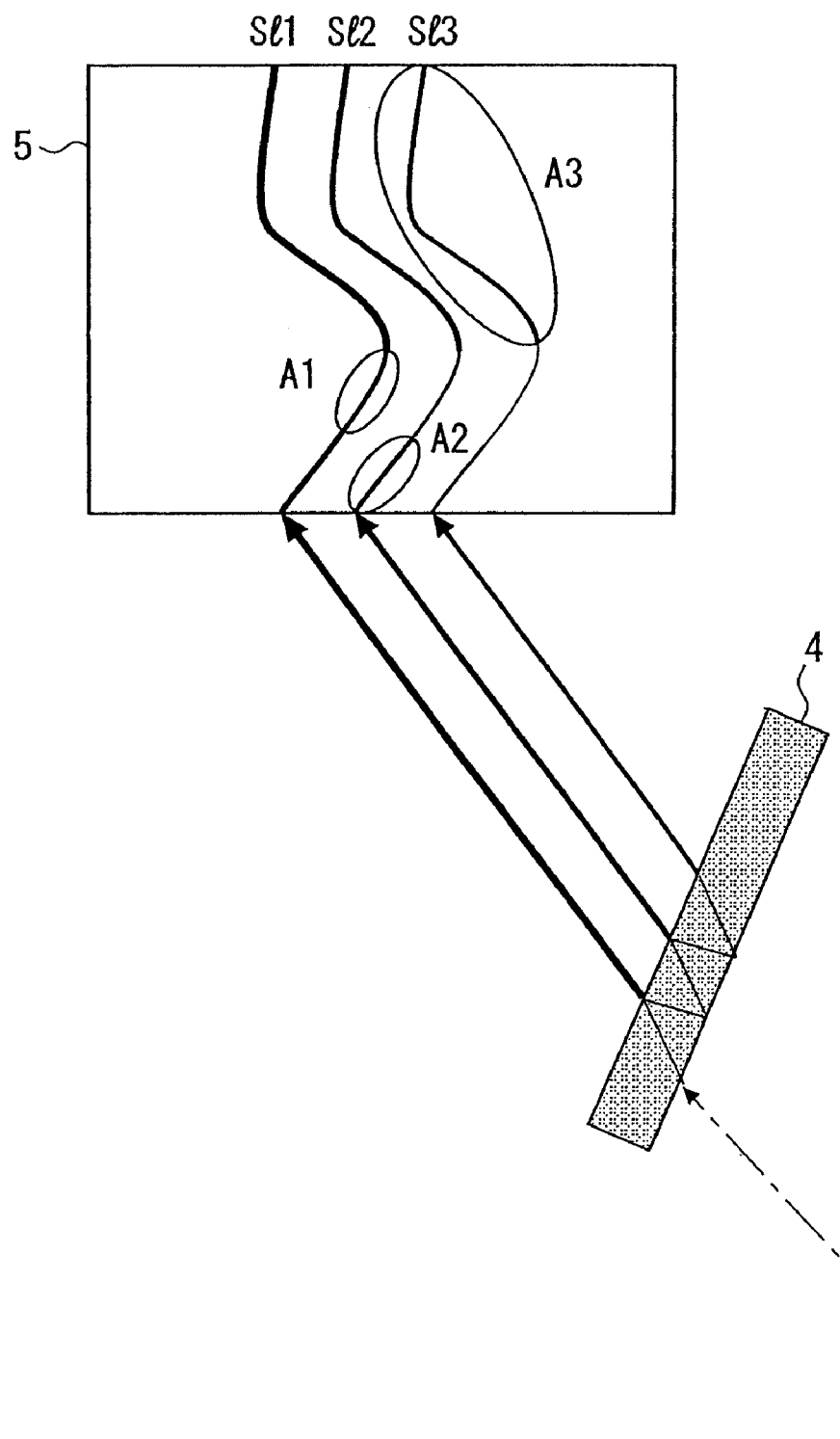
FIG. 3 is a diagram depicting a captured slit image according to the first embodiment.

As FIG. 3 shows, the lights split by passing through the plane parallel plate 4 (first reflected light, second reflected light, third reflected light) are picked up in a direction perpendicular to the slit base line direction with equal interval, by the imaging device 5, as mentioned above, and the imaging device 5 can acquire the first slit picture image S11, second slit picture image S12 and third slit picture image S13.

The inclination angle of the plane parallel plate 4 with respect to the optical axis determines the interval distance of the first, second and third slit picture images (S11, S12, S13) in a direction perpendicular to the slit base line direction. The inclination angle must be determined so that this interval distance is wide enough for the adjacent slit picture images not to overlap, even if each slit picture image is spread by the inclination of the surface of the test object 20. However increasing the inclination angle increases the interval distance between each slit picture image, but is not desirable in terms of the optical aberrations. For example, an even more preferable shape measurement can be performed by disposing a rotatable mechanism on the plane parallel plate 4 so that the inclination angle can be variable, and setting the inclination angle to an inclination angle which is the minimum required depending on the characteristics of the surface of the test object (e.g. inclination of the surface). By combing two half mirrors, or by filling the inside of the plane parallel plate 4 with liquid, the thickness of the plane parallel plate 4 can be changed, whereby out of focus of the first, second and third slit picture images can be decreased when a test object, of which inclination of the surface is small, is measured.

Figure 10:
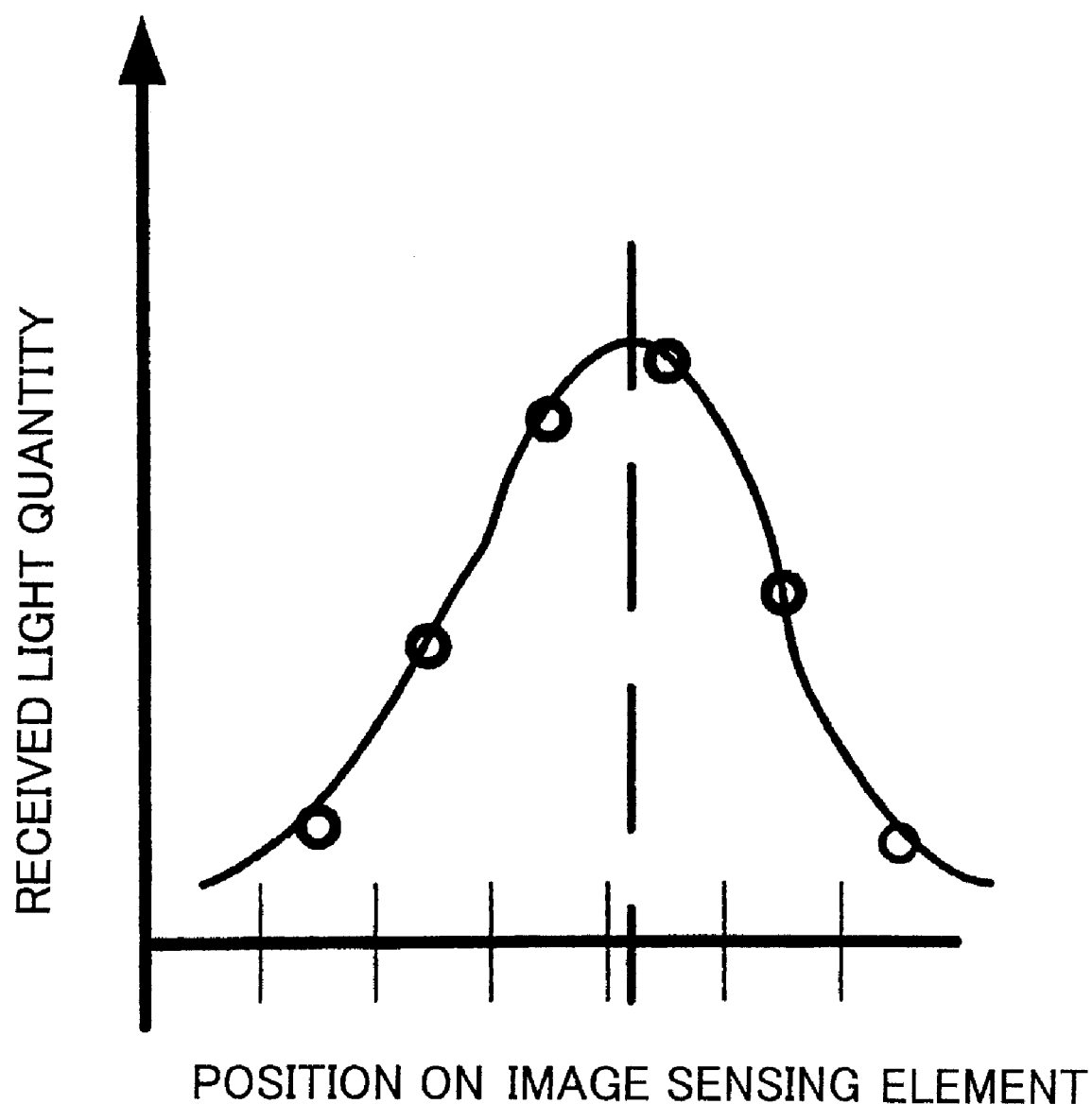
FIG. 10 is a graph depicting a relationship of a position on the image sensing element and received light quantity.

The slit picture images picked up by the imaging device 5 is sent to the processing device 7. In the slit picture image selection unit 8 in the processing device 7, as shown in FIG. 3, a slit picture image having an optimum brightness to compute the height of the test object 20 from the reference plane (stage surface of the XYZ stage 6) is selected for each pixel in the slit base line direction, out of the first, second and third slit picture images (S11, S12, S13) picked up by the imaging device 5 (step S3). The first, second and third slit picture images (S11, S12, S13) are acquired by picking up the images formed by the reflected light decreased by the plane parallel plate 4, and brightness differs on each pixel on the slit base line direction, depending on the characteristics of the surface of the test object 20 (e.g. inclination and material of the surface) in each slit picture image. Out of these slit picture images, pixels in an area, where any of the pixel signals of several pixels in a direction crossing the base line direction are not saturated, must be selected for each pixel on the slit base line direction. Specifically, the pixels with which an image having a light quantity distribution as shown in FIG. 10 are selected. The abscissa in FIG. 10 indicates the position of pixels in a direction crossing the slit base line direction in an area where the slit picture image is projected, and the ordinate indicates the received light quantity. A white circle in the graph indicates the light quantity which each pixel actually received. In this way, a pixel of which received light quantity of each pixel is a saturated brightness value or less in a direction crossing the slit base line direction is detected on the slit base line direction. In this way, the slit picture image must be selected for each pixel on the slit base line direction (slit picture images in circles A1 to A3 in FIG. 3 are selected).

Every time the XYZ stage 6 (test object 20 on the XYZ stage 6) is moved by the XYZ stage drive unit 12 so that the slit projection pattern is projected onto the entire surface of the test object 20 by the slit pattern projection unit 1, the slit picture image with optimum brightness is selected for each pixel in the slit base line direction, and slit picture image data for computing the height of the surface of the test object 20 from the stage surface is acquired for the entire surface of the test object 20 (step S4).

In the slit picture image selection unit 8, image data with optimum brightness to compute the height of the surface of the selected test object 20 from the stage surface, as well as a signal from the encoder installed in the XYZ stage drive unit 12 (signal to indicate the position of the test object 20 placed on the XYZ stage 6 in the stage moving direction, that is, the position of the test object 20 of the slit projection pattern in the scanning direction) are sent to the shape computing unit 9 in the processing device 7, and the shape of the test object 20 is measured using the principle of trigonometric measurement (step S5). At this time, an accurate center position of the slit picture image is determined for each of the slit base line directions, then the shape is measured using the principle of trigonometric measurement. Specifically, as FIG. 10 shows, a curve connecting each white circle is determined so that brightness distribution with normal distribution is implemented based on the actually received light quantity of each pixel. And a position corresponding to the maximum value of this curve is determined as the center position of the slit image. In this way, a shape can be measured accurately using the principle of trigonometric measurement. Therefore if the received light quantity is saturated or if the received light quantity is extremely small, determining this curve is difficult, so as this embodiment shows, a portion of which light quantity is the optimum is selected from slit picture images of which received light quantity changes in stages, and the shape is measured, whereby accurate shape can be measured.

On the XYZ stage 6, the test object 20 and the calibration plate 30 (height H from the stage surface of the XYZ stage 6 is known) are placed, and every time the slit projection pattern is scanned on the surface of the test object 20 by the XYZ stage drive unit 12, the slit projection pattern is also projected onto the calibration plate 30. The slit projection pattern is projected onto the surface of the calibration plate 30 by irradiating the slit light 2 projected from the slit pattern projection unit 1 onto the calibration plate 30, the reflected lights from the surface of the calibration plate 30 are condensed via the imaging lens 3 and the plane parallel plate 4, and the projected slit projection pattern is imaged on the surface of the calibration plate 30 by the imaging device 5.

Figure 4:
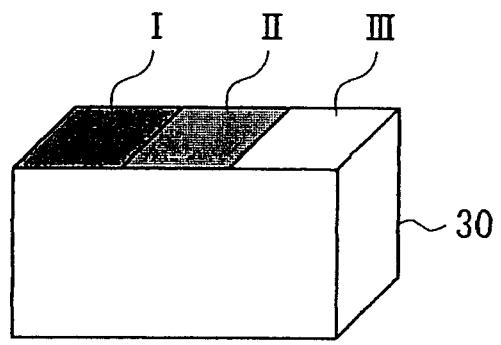
FIG. 4 is a diagram depicting calibration slit images according to the first embodiment.
Figure 4:
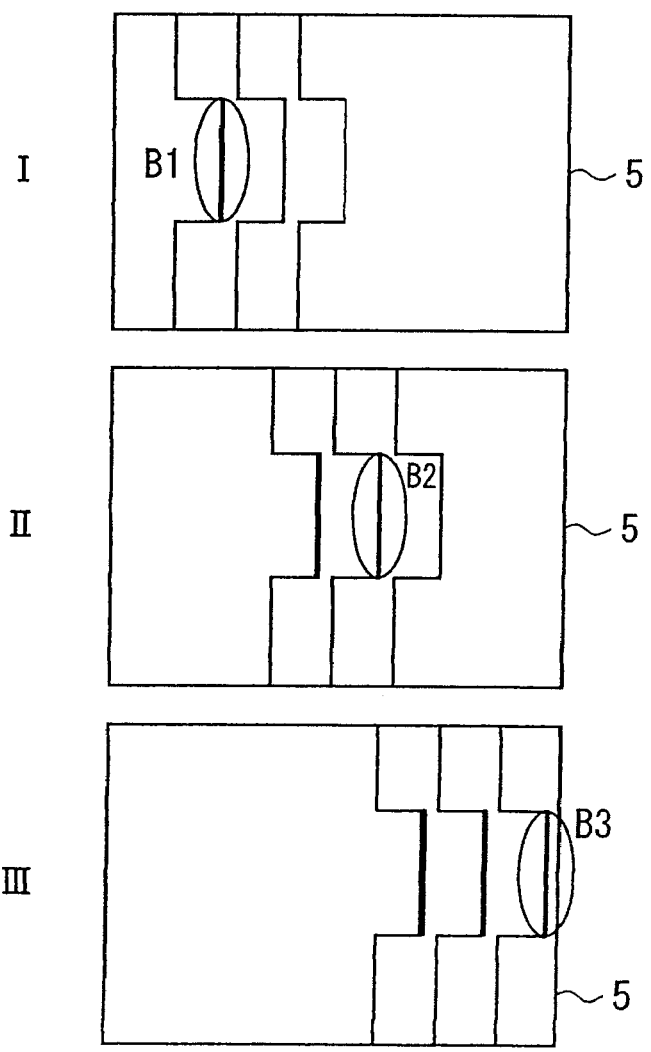

As FIG. 4 shows, in the surface of the calibration plate 30 (surface on which the slit projection pattern is projected), gradation is created in a direction perpendicular to the slit base line direction, corresponding to the brightness difference in each reflected light depending on the characteristics of the surface of the test object 20 (e.g. inclination and material of the surface) (gradation is created on the calibration plate 30 so that image is picked up, corresponding to A1 having gradation I where the first slit picture image is selected, A2 having gradation II where the second slit image is selected, and A3 having gradation III where the third slit image is selected, are acquired), and the imaging device 5 picks up the I, II and III calibration slit picture images in gradations I, II and III respectively.

The I, II and III calibration slit picture images acquired in each gradation position by the imaging device 5 are sent to the shape calibration unit 10 of the processing device 7. The shape calibration unit 10 is for calibrating the distortion of the optical system (imaging lens 3 and plane parallel plate 4) between the test object 20 and the imaging device 5. By the shape calibration unit 10, the height of the surface of the calibration plate 30 from the reference plane (stage surface of the XYZ stage 6) is calculated using each calibration slit picture image (a slit picture image in circles B1 to B3 in FIG. 4 is selected) corresponding to the brightness of the first, second or third slit picture image (slit picture images A1 to A3 in FIG. 3) selected above to measure the shape of the test object 20, and the ratio of this height to the height H of the surface of the calibration plate 30 from the stage surface, which is known, is acquired as a shape calibration coefficient for the selected portion of each slit image (step S6).

In other words, the shape calibration coefficient C1=H/L1 is for the first slit picture image (slit image picture A1 in FIG. 3) selected for measuring the shape of the test object 20, the shape calibration coefficient C2=H/L2 is for the second slit picture image (slit picture image A2 in FIG. 3) and the shape calibration coefficient C3=H/L3 is the third slit picture image (slit picture image A3 in FIG. 3). Here L1, L2 and L3 are the heights of the surface of the calibration plate 30 from the stage surface, calculated using each calibration slit picture image (slit picture images B1, B2 and B3 in FIG. 4) corresponding to the brightness of the first, second and third slit picture images (slit picture image A1, A2 and A3 in FIG. 3).

Using the slit picture image data selected by the slit picture image selection unit 8, the height of the surface of the test object 20 from the stage surface, computed by the shape computing unit 9, is calibrated by each shape calibration coefficient, and the accurate shape measurement result of the test object 20 is acquired (step S7).

As described above, the reflected lights from the surface of the test object 20 are condensed by the imaging 3 and are split into beams having different brightness via the plane parallel plate 4, and each slit picture image formed in a direction perpendicular to the slit base line direction with a predetermined interval is picked up by the imaging device 5. In this way, the shape of the test object 20 is measured using a position signal of the slit projection pattern on the surface of the test object 20 in the scanning direction sent from the encoder installed on the XYZ stage drive unit 12, along with the slit picture image data acquired by selecting a slit picture image with optimum brightness to compute the height of the surface of the test object 20 from the stage surface, out of each slit picture images picked up by the imaging device 5 for each pixel in the slit base line direction. Also using the calibration plate 30 of which height H from the stage surface of the XYZ stage 6 is known, a shape calibration coefficient corresponding to the brightness of each slit picture image selected for measuring the shape of the test object 20 is acquired. The height from the surface of the test object 20 from the stage surface, determined above, is calibrated using this shape calibration coefficient, so as to acquire an accurate shape measurement result of the test object 20.

As a result, for a test object 20 on which the slit pattern projection unit 1 projected a slit projection pattern formed by one slit light 2, the imaging unit forms a plurality of slit picture images by separating the slit projection pattern in a direction perpendicular to the slit base line direction using the imaging lens 3 and plane parallel plate 4, and acquires the slit picture images by effectively utilizing the surplus pixels on the image formation plane, without receiving the influence of the characteristics of the surface of the test object, so that the three-dimensional shape of the test object 20 can be determined based on the principle of trigonometric measurement.

Figure 5:
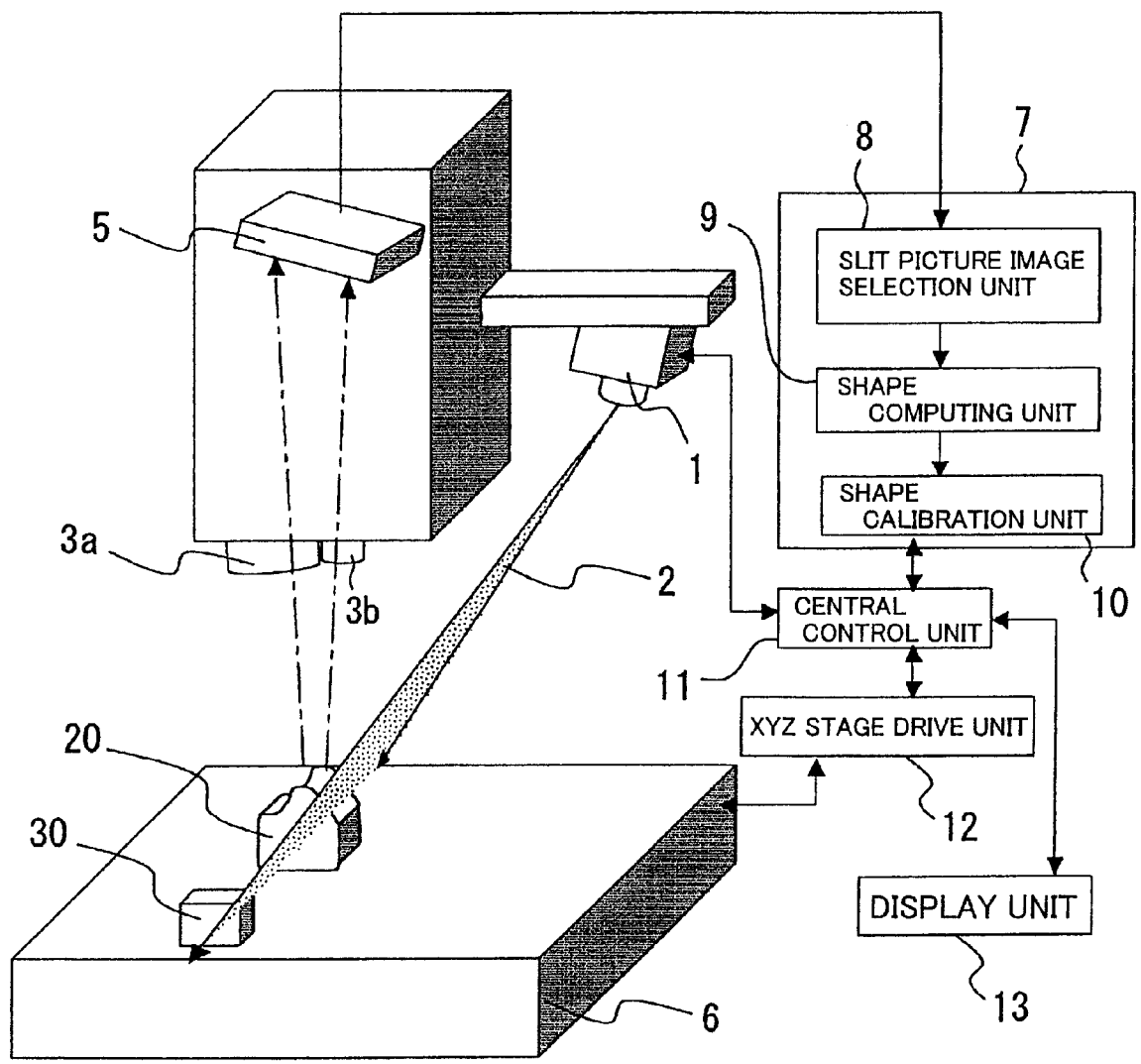
FIG. 5 is a diagram depicting a general configuration of a shape measuring device according to a second embodiment of the present invention.

FIG. 5 shows a general configuration of a shape measuring device according to the second embodiment. This shape measuring device will be described first with reference to FIG. 5. In the second embodiment of the present embodiment, each element having an identical function as that in the first embodiment is denoted with an identical element number, for which description is omitted.

This shape measuring device comprises: a central control unit 11 which is a computer, a slit pattern projection unit 1 that projects slit light 2 onto a test object 20 and a calibration plate 30, an XYZ stage (supporting table) 6 on which the test object 20 and the calibration plate 30 are placed, an imaging unit that picks up a reflected pattern image of a slit light 2 from the slit pattern projection unit 1, an XYZ stage drive unit 12 that drives the XYZ stage 6 (and/or the imaging unit), and relatively moves in the XYZ directions with respect to the imaging unit; a processing device 7 that computes the shape of the test object 20 by processing image data from the imaging unit; and a display unit 13 that displays the shape and shape data (values) of the test object 20, determined by the processing device 7, and is controlled by the central control unit 11.

The imaging unit is comprised of a first imaging lens 3a, a second imaging lens (group) 3b which is disposed closer to the optical axis (projection light axis) of the slit light 2 than the first imaging lens (group) 3a, and an imaging device 5 (e.g. two-dimensional CCD element) for picking up the reflected pattern images which were formed via the first imaging lens 3a and second imaging lens 3b respectively. The image data picked up by the imaging device 5 is sent to the processing device 7, where the later mentioned image processing and shape measurement of the test object 20 are performed. The first imaging lens 3a and the second imaging lens 3b are constructed such that the principal rays reflected from the test object 20 and the calibration plate 30 are in parallel with the optical axis (object side telecentric optical system).

This shape measuring device is constructed such that an intersection of the imaging surface of the imaging device 5 that picks up the slit projection pattern on the surface of the test object 20 and the calibration plate 30, on which the slit light 2 is projected by the slit pattern projection unit 1, and the principal plane of the first imaging lens 3a is located on the optical axis of the slit light 2 (shiempflug's optical system). Therefore, images of the test object 20 on which the slit light 2 is projected by the slit pattern projection unit 1 and the slit projection pattern on the surface of the calibration plate 30 can always be picked up at a focal position in the imaging device 5, and numerical aperture NA1 of the first imaging lens 3a can be increased (e.g. NA1=0.02 to 0.03).

The second imaging lens 3b has a numerical aperture NA2 which is smaller than the first imaging lens 3a (e.g. NA2=0.01 to 0.005), and is located closer to the optical axis (projection light axis) of the slit light 2 than the first imaging lens 3a. The second imaging lens 3b does not have the shiempflug's optical system, but the second imaging lens 3b can have a deep depth of field, since the imaging unit including the second imaging lens 3b is constructed as the object 20 side telecentric optical system.

Figure 6:
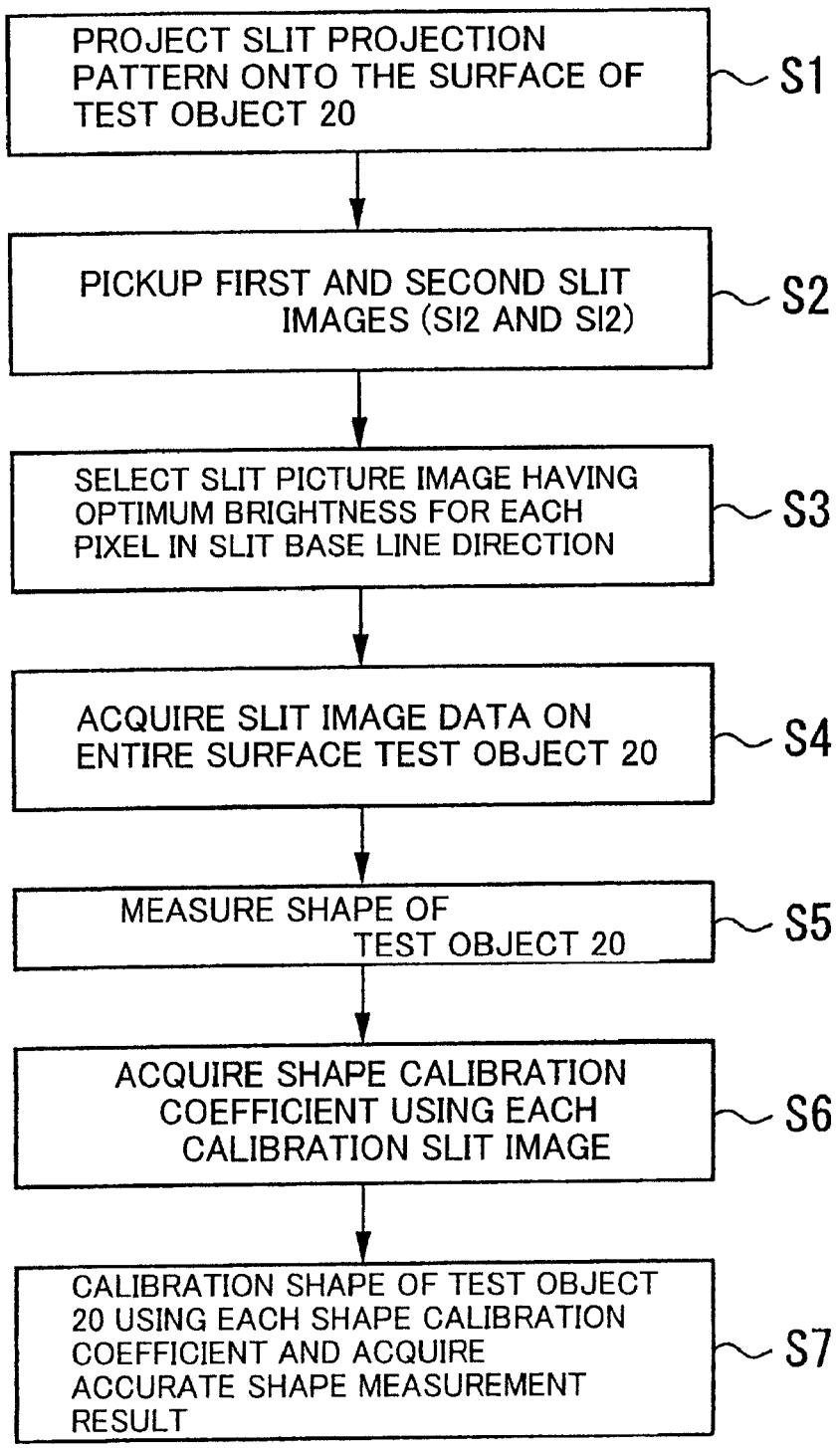
FIG. 6 is a flow chart depicting a shape measuring method according to the second embodiment.

A method for measuring the shape of the test object 20 using the shape measuring device constructed as above will now be described with reference to the flow chart in FIG. 6.

For this measurement, the slit light 2 projected from the slit pattern projection unit 1 is irradiated onto the test object 20 so as to project the slit projection pattern on the surface of the test object 20 (step S1).

Figure 7:
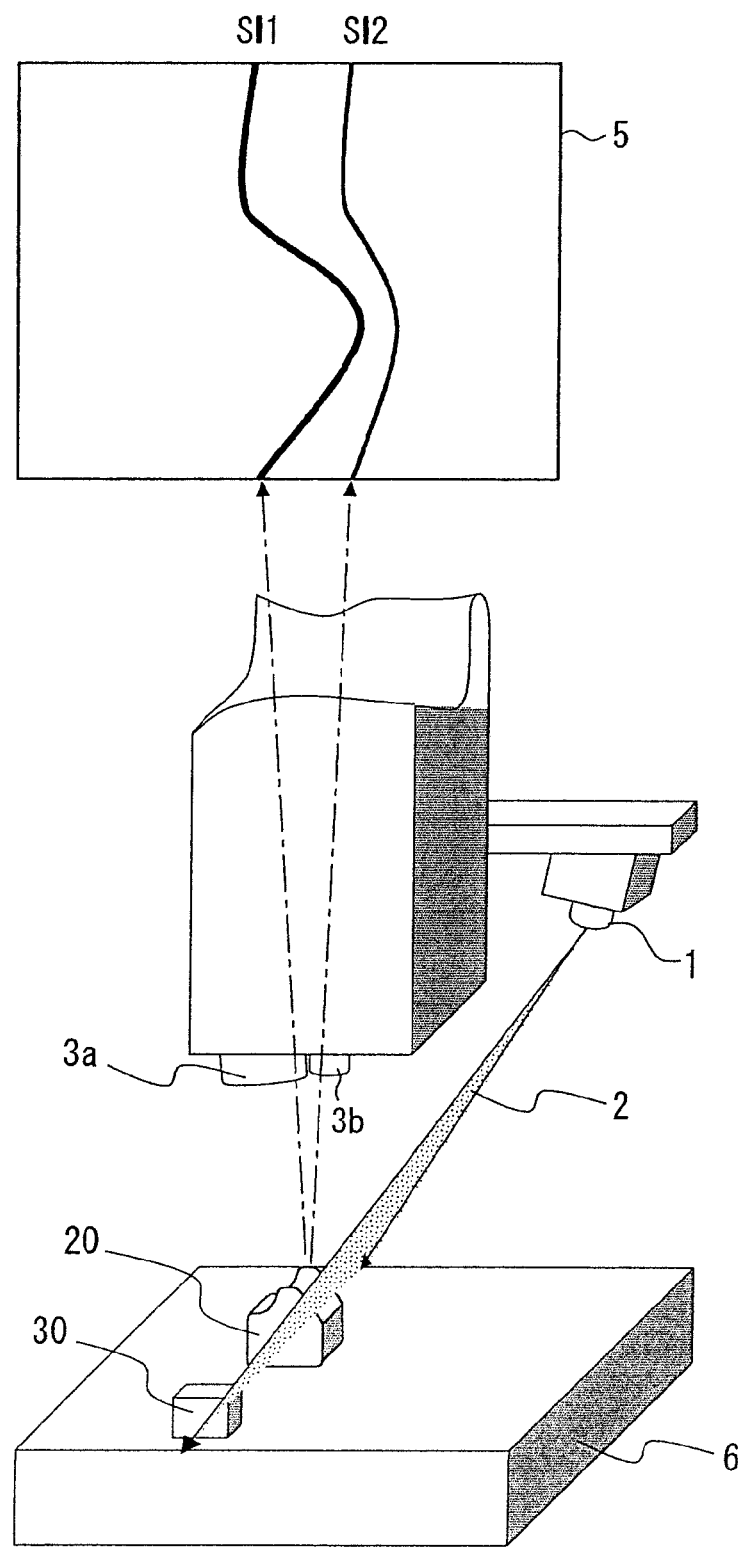
FIG. 7 is a diagram depicting a captured slit image according to the second embodiment.

As FIG. 7 shows, the first reflected light generated by being projected like this, reflected from the surface of the test object 20, and condensed via the first imaging lens 3a, and the second reflected light condensed via the second imaging lens 3b are picked up respectively in the imaging device 5 as a first slit picture image S11 (captured image based on the first reflected light) and a second slit picture image S12 (captured image based on the second reflected light) in a predetermined direction from the slit base line direction (perpendicular in the case of the present embodiment) with a predetermined interval (step S2).

The predetermined interval in a predetermined direction from the slit base direction between the first slit picture image S11 and the second slit picture image S12 picked up by the imaging device 5 is determined by the respective numerical aperture or installation position of the first imaging lens 3a and the second imaging lens 3b, but the numerical aperture or the installation position must be determined so that it is wide enough for both slit picture images not to overlap even when each slit picture image is spread due to the inclination on the surface of the test object 20.

The slit picture images picked up by the imaging device 5 are sent to the processing device 7. In the slit picture image select unit 8 in the processing device 7, a slit picture image having optimum brightness to compute the height of the surface of the test object 20 from the reference plane (stage surface of the XYZ stage 6), is selected for each pixel in the slit base line direction, out of the first slit picture image S11 and second slit picture image S12 picked up by the imaging device 5 (step S3).

The numerical aperture NA2 of the second imaging lens 3b is smaller than the numerical aperture NA1 of the first imaging lens 3a, so the brightness of the image formed by the second reflected light is smaller than the brightness of the image formed by the first reflected light. Therefore the first slit picture image S11 and the second slit picture image S12 are picked up based on reflected lights having different brightness from each other, and each pixel of each slit picture image on the slit base line direction as well has different brightness depending on the characteristics of the surface of the test object 20 (e.g. inclination and material of the surface). Since the second imaging lens 3b is located closer to the optical axis (projection light axis) of the slit light 2 than the first imaging lens 3a, the influence of the imaging angle (occlusion) on the test object 20 of the imaging unit is smaller in the second slit picture image S12 than the first slit picture image S11, and can be picked up as a more stable slit picture image.

Therefore a slit picture image having a brightness within a predetermined value (within a range of optimum brightness to compute the height of the surface of the test object 20 from the stage surface), which is set in advance in the slit base line direction, is selected for each pixel in the slit base line direction, out of each slit picture image.

Every time the test object 20 on the XYZ stage 6 is moved by the XYZ stage drive unit 12 so that the slit projection pattern is projected on the entire surface of the test object 20 by the slit pattern projection unit 1, a slit picture image having an optimum brightness is selected for each pixel on the slit base line direction, as mentioned above, and slit picture image data to compute the height of the surface of the test object 20 from the stage surface on the entire surface of the test object 20 is acquired (step S4).

In the slit image selection unit 8, a signal from the encoder installed in the XYZ stage drive unit 12 (signal to indicate the moving direction of the test object 20 placed on the XYZ stage 6, that is, a position of the slit projection pattern on the surface of the test object 20 in the scanning direction) is sent to the shape computing unit 9 of the processing device 7, along with the slit picture image data for calculating the height of the surface of the selected test object 20 from the stage surface, and the shape of the test object 20 is measured using the principle of trigonometric measurement (step S5).

On the XYZ stage 6, the calibration plate 30 (height H from the stage surface of the XYZ stage 6 is known) is placed along with the test object 20, and when the slit projection pattern is scanned on the surface of the test object 20 by the XYZ stage drive unit 12, the slit projection pattern is also projected on the calibration plate 30. The slit light 2 projected from the slit pattern projection unit 1 is irradiated onto the calibration plate 30 to project the slit projection pattern on the surface of the calibration plate 30, and the images formed by the first reflected light which is a light reflected from the surface of the calibration plate 30 and condensed via the first imaging lens 3a, and the second reflected light which is a light condensed via the second imaging lens 3b, are picked up by the imaging device 5 respectively, and the slit projection pattern projected on the surface of the calibration plate 30 is picked up.

Hereafter, in the same manner as the first embodiment, each calibration slit picture image corresponding to the brightness of the first slit picture image S11 and second slit picture image S12, selected for measuring the shape of the test object 20 by the shape calibration unit 10, is acquired, then the height of the surface of the calibration plate 30 from the stage surface is computed, and the ratio of this height to the height H of the surface of the calibration plate 30 from the stage surface (known) is acquired for a selected portion of each slit picture image as the shape calibration coefficient (step S6).

Using the slit picture image data selected by the slit picture image selection unit 8, the height of the surface of the test object 20 from the stage surface, computed by the shape computing unit 9, is calibrated by each shape calibration coefficient, and the accurate shape measurement result of the test object 20 is acquired (step S7).

As described above, with the reflected light from the surface of the test object 20, the images generated by the first reflected light condensed via the first imaging lens 3a and by the second reflected light condensed via the second imaging lens 3b, of which numerical aperture is smaller than the first imaging lens 3a, and which is disposed closer to the optical axis (projection light axis) of the slit light 2 than the first imaging lens 3a, are picked up by the imaging device 5, as each slit image with a predetermined interval in a predetermined direction from the slit base line direction. In this way, the shape of the test object 20 is measured using a position signal of the slit projection pattern on the surface of the test object 20 in the scanning direction sent from the encoder installed in the XYZ stage drive unit 12, along with the slit picture image data acquired by selecting a slit picture image with optimum brightness to compute the height of the surface of the test object 20 from the stage surface, out of each slit picture image picked up by the imaging device 5 for each pixel on the slit base line direction. Also using the calibration plate 30 of which height H from the stage surface of the XYZ stage 6 is known, the shape calibration coefficient corresponding to the brightness of each slit picture image selected for measuring the shape of the test object 20 is acquired, the height of the surface of the test object 20 from the stage surface, determined above, is calibrated using this shape calibration coefficient, so as to acquire an accurate shape measurement result of the test object 20.

As a result, for a test object 20 on which the slit pattern projection unit 1 projected a slit projection pattern formed by one slit light 2, the imaging unit forms a plurality of slit picture images by separating the slit projection patterns in a predetermined direction from the slit base line direction using the first imaging lens 3a and the second imaging lens 3b, and acquires the slit image by effectively utilizing the surplus pixels on the image formation plane, minimizing occlusion, so that the three-dimensional shape of the test object 20 can be determined based on the principle of the trigonometric measurement. It is preferable to separate the plurality of slit picture images in a direction perpendicular to the slit base line direction to form images, in order to prevent these images from overlapping.

Figure 8:
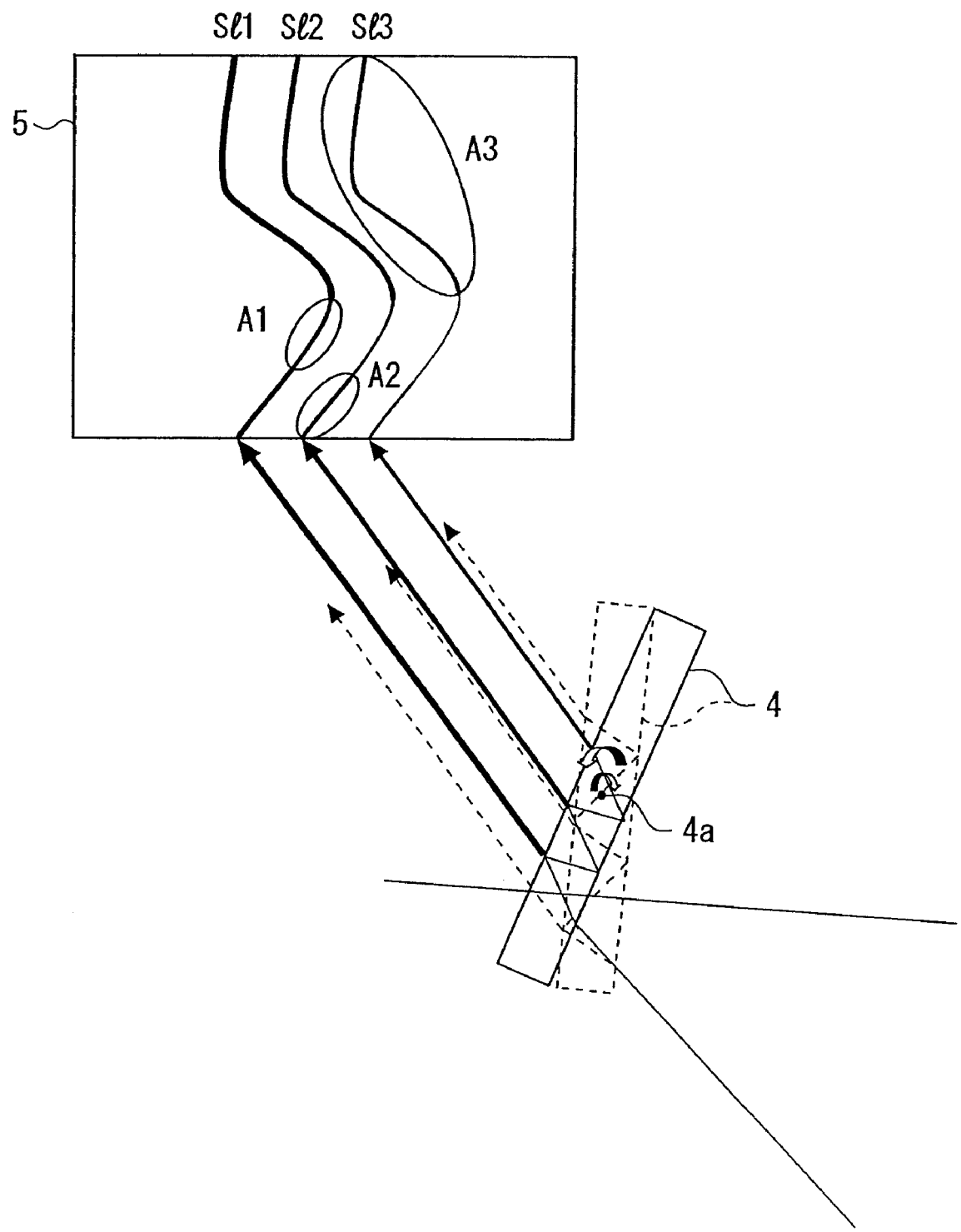
FIG. 8 is a diagram depicting an adjustment mechanism of a plane parallel plate according to the first embodiment.
Figure 9:
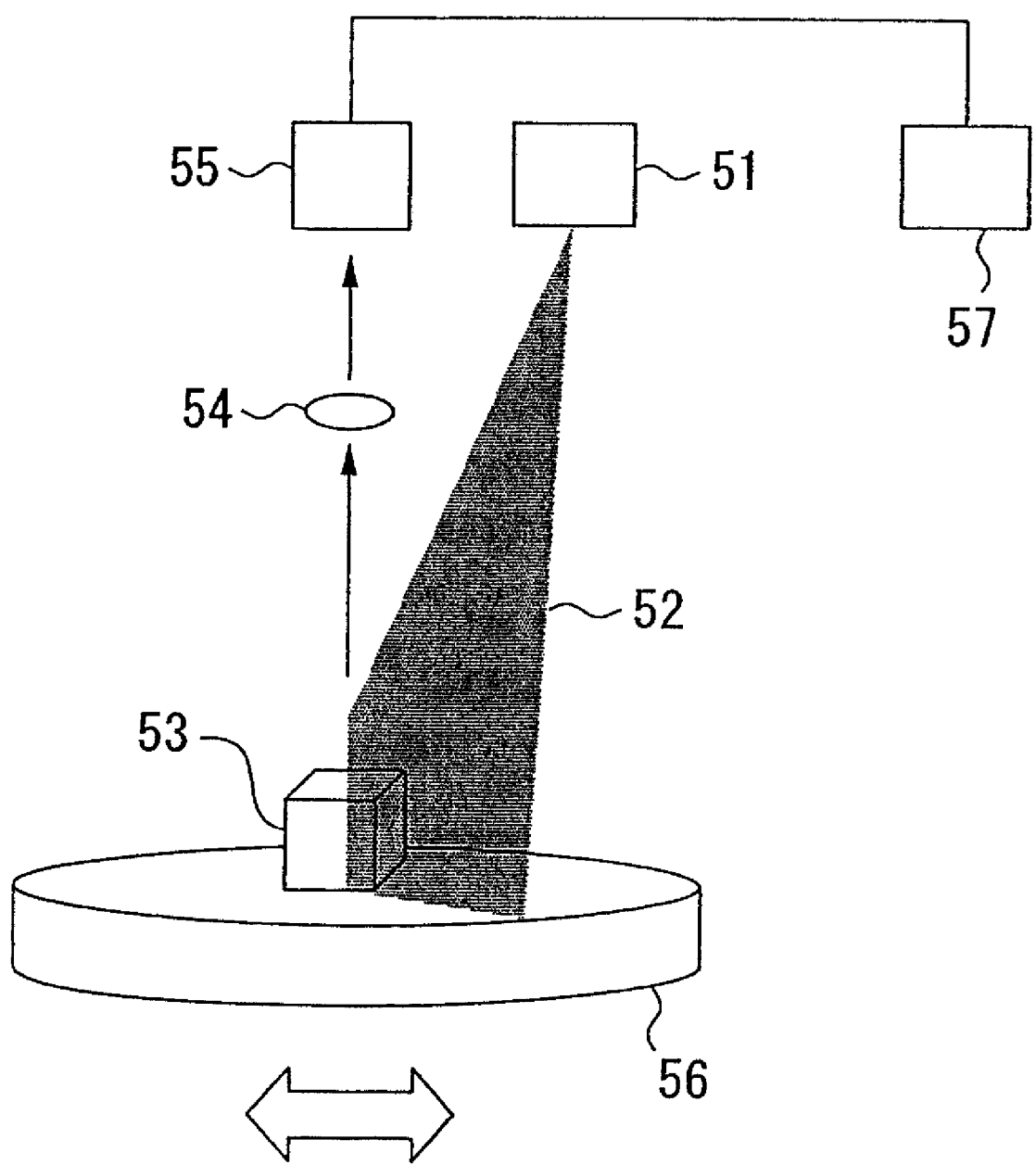
FIG. 9 is a diagram depicting a general configuration of a conventional shape measuring device.

The present invention is not limited to the above embodiments, but can be modified in various ways within the scope of the spirit thereof. For example, FIG. 8 shows a variant form that can be used for the shape measuring device in the first embodiment, which has an adjustment mechanism that can adjust the interval of the slit images by tilting the plane parallel plate 4. The plane parallel plate 4 has a tilt mechanism to tilt with the central axis 4*a* as the center of rotation, as shown in FIG. 8. This tile mechanism can be adjusted by a rotation axis with an electric motor, or a rotation knob which can be operated externally, which are not illustrated. By this tilt mechanism, the interval of the slit images (S11, S12, S13) on the imaging plane of the imaging device 5 (two-dimensional CCD sensor) can be changed (rays indicated by the dotted lines in FIG. 8). The interval of the slit images is sufficient if it is wider than the width of the slit image, but the greater the number of slit images the better, in order to further increase the dynamic range by the present invention. The width of the slit image changes depending on the inclination angle of the surface of the test object with respect to the measurement device. If the inclination of the surface of the test object 20 is small, the slit image does not become wide, so the inclination of the plane parallel plate 4 can be changed to determine the distance between the slit images. If the inclination of the surface of the test object 20 is large, on the other hand, the slit image becomes wide, so the inclination of the plane parallel plate 4 is changed to increase the distance of the slit images. In this way, the device may be constructed such that the tilt angle of the plane parallel plate 4 can be changed.

What is claimed is:

1. A shape measuring device, comprising:
   a projection unit that projects a slit projection pattern formed of one slit light onto a test object;
   a slit image formation unit that forms a plurality of slit images, which is generated by the slit projection pattern projected from the projection unit is reflected by the test object, separated in a direction perpendicular to a slit base line direction;
   an imaging unit that picks up the plurality of slit images separately formed by the slit image formation unit to generate a plurality of slit picture images;
   a position adjustment unit that relatively moves the slit projection pattern and the test object in a direction different from the slit base direction of the slit projection pattern;
   a slit picture image selection unit that compares brightness of each pixel of slit picture image on the slit base line direction and selects, from the plurality of slit picture images acquired by the imaging unit, a slit picture image having an optimum brightness to determine the shape of the test object on the slit base line direction, and acquires slit image data for determining the shape of the test object; and
   a shape computing unit that computes a shape of the test object using a relative position of the slit projection pattern with respect to the test object, which has been relatively moved by the position adjustment unit, and the slit picture image data acquired by the slit picture image selection unit.

2. The shape measuring device according to claim 1, wherein in the imaging unit, the plurality of slit picture images are formed in the direction perpendicular to the slit base line direction separately as a first slit picture image and at least a second slit picture image, in which brightness distribution of the first slit image is changed.

3. The shape measuring device according to claim 1, wherein in the imaging unit, the plurality of slit picture images are formed in the direction perpendicular to the slit base line direction separately as a first slit picture image and a second slit picture image which is picked up in a position closer to the projection light axis than the first slit picture image.

4. The shape measuring device according to claim 1, wherein in the imaging unit, the plurality of slit picture images are formed in the direction perpendicular to the slit base line direction separately as a first slit picture image and a second slit picture image which is picked up in a position closer to the projection light axis than the first slit picture image and is formed with a smaller numerical aperture than the first slit picture image.

5. The shape measuring device according to any of claims 1 to 4, wherein that in the imaging unit, at least the first slit picture image is formed at a focal position on the image formation plane by inclining the image formation plane with respect to an optical axis of the reflected light generated when the slit projection pattern projected from the projection unit is reflected by the test object, so that the focal plane at the test object side matches the optical axis of the slit projection pattern.

6. The shape measuring device according to any of claims 1 to 4, wherein a shape calibration coefficient for each of the plurality of slit picture images is acquired using a plurality of calibration slit picture images, which the imaging unit acquires by the projection unit projecting the slit projection pattern onto the calibration plate in the same manner as the test object.

7. A method for measuring a three-dimensional shape of a test object using a shape measuring device, which includes a projection unit that projects a slit projection pattern formed of one slit light onto the test object; a slit image formation unit that forms a plurality of slit picture images, which is generated when the slit projection pattern projected from the projection unit is reflected by the test object, separated in a direction perpendicular to a slit base line direction; an imaging unit that picks up the plurality of slit images separately formed by the slit image formation unit to generate a plurality of slit picture images; and a position adjustment unit for relatively moving the slit projection pattern and the test object in a direction different from the slit base direction of the slit projection pattern, the method comprising:
   projecting the slit projection pattern onto the test object from the projection unit;
   picking up the plurality of slit images separately formed by the slit image formation unit with the imaging unit, and generating a plurality of slit picture images;
   comparing the brightness of each pixel of slit picture images on the slit base line direction and selecting a slit picture image having an optimum brightness to determine the height of the test object from the reference plane, from the plurality of slit picture images, and determining the height of the test object from the reference plane; and
   measuring the shape of the test object by using a relative position of the slit projection pattern with respect to the test object which has been relatively moved by the position adjustment unit.

8. The shape measuring method according to claim 7, wherein the imaging unit generates the plurality of slit picture images, a first slit picture image and at least a second slit picture image, in which the brightness distribution of the first slit picture image is changed, are separately formed in the direction perpendicular to the slit base line direction.

9. The shape measuring method according to claim 7, wherein the imaging unit generates the plurality of slit picture images, a first slit image and a second slit image, which is picked up in a position closer to a projection light axis than the first slit picture image and is formed with a smaller numerical aperture than the first slit picture image, are separately formed in the direction perpendicular to the slit base line direction.

10. The shape measuring method according any of claims 7 to 9, wherein the imaging unit generates the plurality of slit picture images, at least the first slit picture image is formed at a focal position on the image formation plane by inclining the image formation plane with respect to an optical axis of the reflected light generated when the slit projection pattern projected from the projection unit is reflected by the test object, so that the focal plane at the test object side matches the optical axis of the slit projection pattern.

11. The shape measuring method according any of claims 7 to 9, wherein measuring the shape of the test object further comprises:
   projecting the slit projection pattern onto a calibration plate from the projection unit in the same manner as the test object;
   picking up a plurality of calibration slit images separately formed by the slit image formation unit with the imaging unit, and generating a plurality of calibration slit picture images;
   determining a height of the calibration plate from the reference plane based on the plurality of calibration slit picture images;
   acquiring a shape calibration coefficient for each of the plurality of slit picture images acquired by the imaging unit; and
   calibrating the height of the test object from the reference plane, determined based on the plurality of slit picture images, and acquiring an accurate shape measurement result of the test object.

* * * * *